US012566419B2

(12) United States Patent
Kitayoshi

(10) Patent No.: US 12,566,419 B2
(45) Date of Patent: Mar. 3, 2026

(54) CONTROL SYSTEM, CONTROL METHOD, AND CONTROL PROGRAM

(71) Applicant: KABUSHIKI KAISHA YASKAWA DENKI, Kitakyushu (JP)

(72) Inventor: Ryohei Kitayoshi, Kitakyushu (JP)

(73) Assignee: KABUSHIKI KAISHA YASKAWA DENKI, Kitakyushu (JP)

(*) Notice: Subject to any disclaimer, the term of this patent is extended or adjusted under 35 U.S.C. 154(b) by 159 days.

(21) Appl. No.: 18/418,452

(22) Filed: Jan. 22, 2024

(65) Prior Publication Data

US 2024/0160179 A1 May 16, 2024

Related U.S. Application Data

(63) Continuation of application No. PCT/JP2021/028648, filed on Aug. 2, 2021.

(51) Int. Cl.
*G05B 19/404* (2006.01)

(52) U.S. Cl.
CPC .. *G05B 19/404* (2013.01); *G05B 2219/41426* (2013.01)

(58) Field of Classification Search
CPC ........ G05B 19/404; G05B 2219/41426; G05B 13/04; H02P 29/00
USPC .................................................. 318/632, 560
See application file for complete search history.

(56) References Cited

U.S. PATENT DOCUMENTS

| | | | | |
|---|---|---|---|---|
| 8,232,758 B2 * | 7/2012 | Okita | ................... | G05B 19/404 |
| | | | | 318/434 |
| 8,779,712 B2 * | 7/2014 | Tanabe | ................... | H02P 23/30 |
| | | | | 318/400.14 |
| 9,166,512 B2 * | 10/2015 | Sonoda | ................... | H02P 23/14 |
| 2015/0008861 A1 | 1/2015 | Sonoda | | |

FOREIGN PATENT DOCUMENTS

| | | |
|---|---|---|
| JP | 2010-051162 A | 3/2010 |
| JP | 2010-172133 A | 8/2010 |
| JP | 2015-015844 | 1/2015 |
| JP | 2018-055603 A | 4/2018 |

OTHER PUBLICATIONS

International Search Report issued Sep. 14, 2021 in PCT/JP2021/028648, filed Aug. 2, 2021, citing document Nos. 16-18 therein, 5 pages.
Japanese Office Action issued Dec. 3, 2024, in corresponding Japanese Patent Application No. 2023-539397 (with English Translation), 11pages.
Japanese Office Action issued Apr. 8, 2025 in Japanese Patent Application No. 2023-539397 (with unedited computer-generated English translation), 9 pages.

* cited by examiner

*Primary Examiner* — David Luo
(74) *Attorney, Agent, or Firm* — Oblon, McClelland, Maier & Neustadt, L.L.P.

(57) ABSTRACT

A control system includes processing circuitry that calculates, based on a control target model that indicates a relationship between an operation of a control target and a friction acting on the control target, a continuous value for compensating for the friction as a feedforward compensation value, generates a command based on the feedforward compensation value, and outputs the command to cause the control target to operate.

20 Claims, 7 Drawing Sheets

FIG. 5

CONTROL SYSTEM, CONTROL METHOD, AND CONTROL PROGRAM

CROSS-REFERENCE TO RELATED APPLICATIONS

The present application is a Bypass Continuation of and claims the benefit of priority to International Application No. PCT/JP2021/028648, filed Aug. 2, 2021, the entire contents of which are incorporated herein by reference.

BACKGROUND OF THE INVENTION

Field of the Invention

One aspect of the present disclosure relates to a control system, a control method, and a control program.

Description of Background Art

Japanese Patent Application Laid-Open Publication No. 2015-15844 describes a motor control device that controls a motor that drives a control target. The entire contents of this publication are incorporated herein by reference.

SUMMARY OF THE INVENTION

According to one aspect of the present invention, a control system includes processing circuitry that calculates, based on a control target model that indicates a relationship between an operation of a control target and a friction acting on the control target, a continuous value for compensating for the friction as a feedforward compensation value, generates a command based on the feedforward compensation value, and outputs the command to cause the control target to operate.

According to another aspect of the present invention, a control method to be executed by a control system including processing circuitry includes calculating, by the processing circuitry of the control system, based on a control target model that indicates a relationship between an operation of a control target and a friction acting on the control target, a continuous value for compensating for the friction as a feedforward compensation value, generating, by the processing circuitry of the control system, a command based on the feedforward compensation value, and outputting, by the processing circuitry of the control system, the command to cause the control target to operate.

According to yet another aspect of the present invention, a non-transitory computer-readable storage medium includes computer executable instructions. The instructions, when executed by a computer, cause the computer to perform a method that includes calculating, based on a control target model that indicates a relationship between an operation of a control target and a friction acting on the control target, a continuous value for compensating for the friction as a feedforward compensation value, generating a command based on the feedforward compensation value, and outputting the command to cause the control target to operate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 illustrates an example of a control target model;

DETAILED DESCRIPTION OF THE EMBODIMENTS

Figure 1:
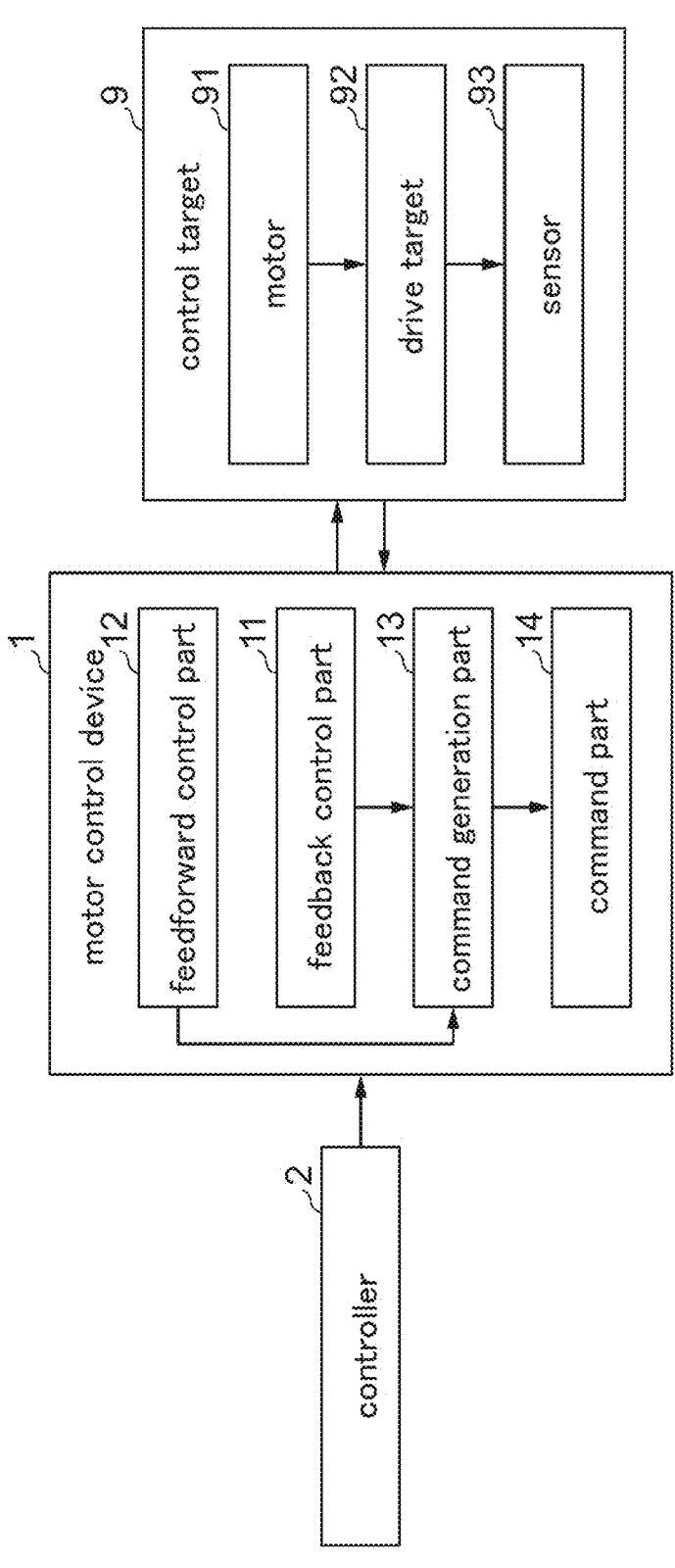
FIG. 1 illustrates an example of an application of a control system.

Embodiments will now be described with reference to the accompanying drawings, wherein like reference numerals designate corresponding or identical elements throughout the various drawings.

Structure of System

FIG. 1 illustrates an example of application of a control system according to an embodiment of the present disclosure. In the present embodiment, the control system according to the present disclosure is applied to a motor control device 1. In one example, the motor control device 1 is connected to a controller 2 via a communication network and is electrically connected to a control target 9. The communication network connecting devices may be a wired network or a wireless network. The communication network may include at least one of the Internet and an intranet. Or, the communication network may simply be realized by one communication cable. FIG. 1 illustrates a structure in which one control target 9 is connected to one motor control device 1. However, the motor control device 1 may be connected to multiple control targets 9.

The motor control device 1 is a device for causing an output of a motor 91 of the control target 9 to follow a command signal from the controller 2. Based on the command signal, the motor control device 1 generates electric power for operating the motor 91 and supplies the electric power to the motor 91. The electric power to be supplied corresponds to a drive force command such as a torque command or a current command. The motor control device 1 may be, for example, an inverter or a servo amplifier.

The controller 2 is a device that outputs a command signal for operating the control target 9 to the motor control device 1. Examples of the command signal include a position command and a speed command.

The control target 9 is a device that executes a useful work by receiving power and performing a predetermined operation according to a purpose. The control target 9 can also be referred to as a machine. For example, the control target 9 can be an industrial machine, a machine tool, or a robot. In one example, the control target 9 includes a motor 91, a drive target 92, and a sensor 93.

The motor 91 is a device that generates power for driving the drive target 92 that processes a workpiece according to the electric power supplied from the motor control device 1. The motor 91 may be a rotary motor that rotates the drive target 92, or a linear motor that displaces the drive target 92 along a straight line. The motor 91 may be a synchronous motor or an induction motor. The motor 91 may be a permanent magnet type synchronous motor such as an SPM (Surface Permanent Magnet) motor or an IPM (Interior Permanent Magnet) motor. The motor 91 may be a synchronous motor without a permanent magnet, such as a synchronous reluctance motor. The motor 91 may be a DC motor or an AC motor.

The sensor 93 is a device that detects a response of the control target 9 that operates with the electric power from the motor control device 1. The response refers to an output of the control target 9 in response to a command for controlling the control target 9. For example, the response indicates information regarding at least one of an operation and a state of the control target 9. The response may indicate information regarding at least one of an operation and a state of the motor 91, for example, may indicate at least one of a shaft speed and a magnetic pole position of the motor 91. The response may indicate information regarding at least one of an operation and a state of the drive target 92, for example, may indicate at least one of a position and a speed of the drive target 92. When the motor 91 is of a rotary type, a rotation angle of the drive target 92 by the motor 91 corresponds to the "position," and a rotation speed of the drive target 92 by the motor 91 corresponds to the "speed." In one example, the sensor 93 is a rotary encoder that outputs a pulse signal of a frequency proportional to an operating speed of the drive target 92. The rotary encoder can acquire both a position and a speed of the drive target 92. The sensor 93 transmits a response signal indicating a response to the motor control device 1. The response may be a value acquired by the sensor 93, or may be expressed by a value calculated or processed by a given operation or algorithm.

FIG. 1 also illustrates an example of a functional structure of the motor control device 1. In one example, the motor control device 1 includes, as functional structural elements, a feedback control part 11, a feedforward control part 12, a command generation part 13, and a command part 14. The feedback control part 11 is a functional module that calculates a feedback command value by feedback control based on a response from the control target 9. The feedforward control part 12 is a functional module that calculates a feedforward compensation value by feedforward control for compensating for a friction acting on the control target 9. In the present disclosure, a friction is a physical phenomenon that occurs as a resistance to an operation of the control target 9, and is a type of disturbance. The command generation part 13 is a functional module that generates a command (drive force command) for causing the control target 9 to operate, based on a feedback command value and a feedforward compensation value. The command part 14 is a functional module that outputs a generated command to the control target 9. The motor control device 1 having the feedback control part 11 and the feedforward control part 12 is an example of a 2-degree-of-freedom control system.

Figure 2:
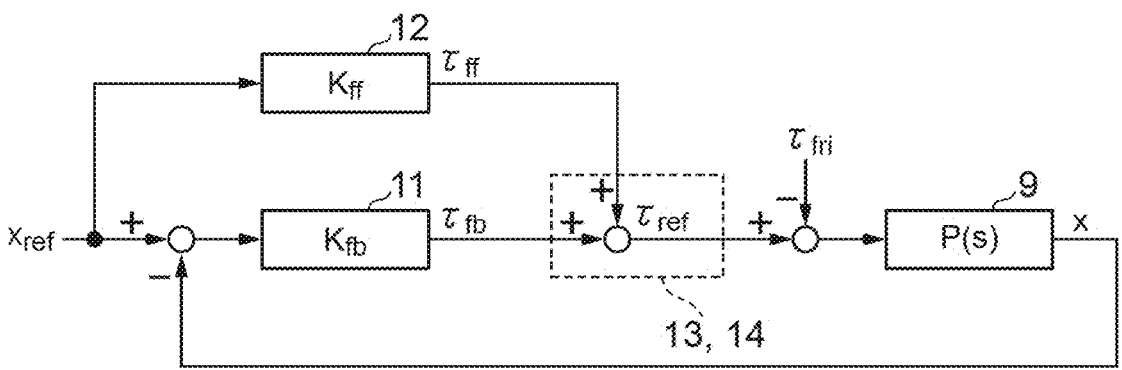
FIG. 2 is a block diagram illustrating an example of an application of the control system.

FIG. 2 is a block diagram illustrating an example of the motor control device 1 (control system). In this diagram, $K_{fb}$ is a transfer function of the feedback control part 11, $K_{ff}$ is a transfer function of the feedforward control part 12, and P(s) is a transfer function of the control target 9. $x_{ref}$ is a command input from the controller 2, for example, a position command. x is a control amount of the control target 9. $\tau_{fb}$ is a feedback command value from the feedback control part 11, and relates to, for example, a torque command. $\tau_{ff}$ is a feedforward compensation value from the feedforward control part 12, and relates to, for example, a torque command. $\tau_{ref}$ is a command output to the control target 9, for example, a final torque command. $\tau_{fri}$ is a friction acting on the control target 9, for example, a friction torque.

Figure 3:
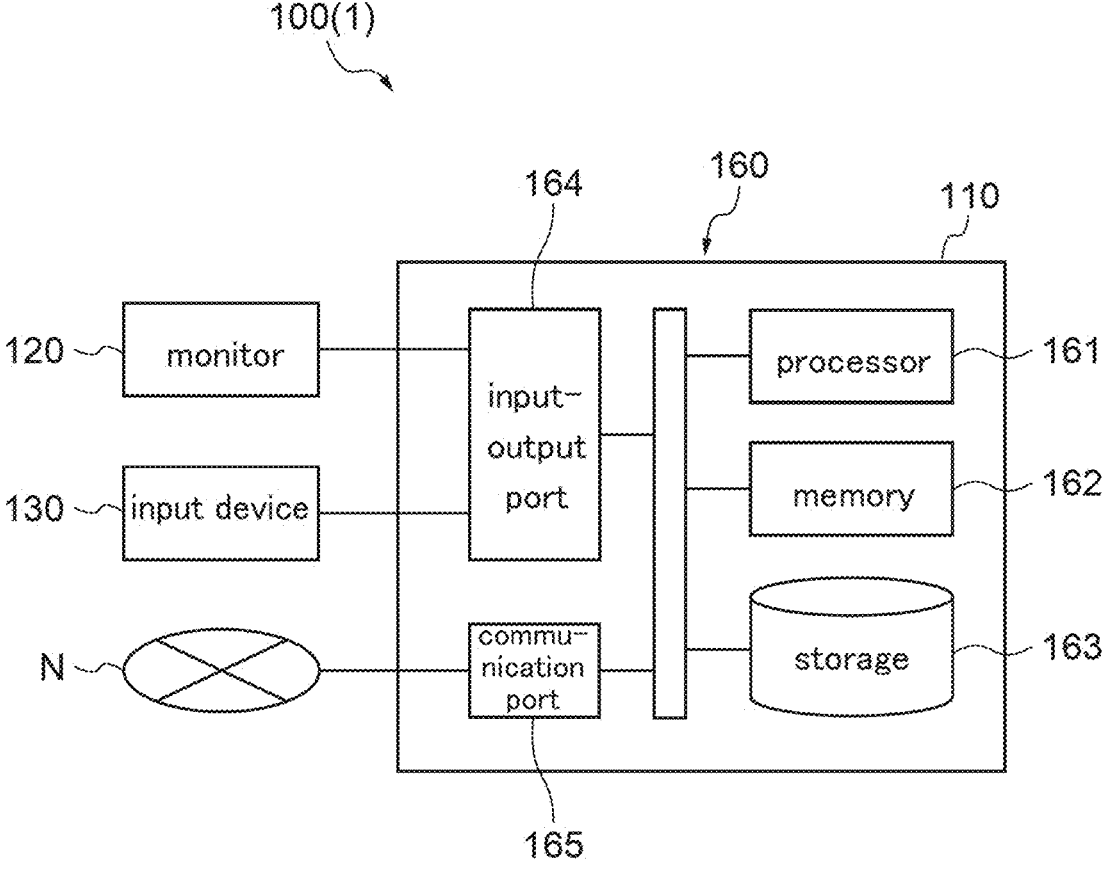
FIG. 3 illustrates an example of a hardware structure of a computer used for the control system.

FIG. 3 illustrates an example of a hardware structure of a computer 100 used for the motor control device 1. In this example, the computer 100 includes a main body 110, a monitor 120, and an input device 130.

The main body 110 is a device having a circuit 160. The circuit 160 includes at least one processor 161, a memory 162, a storage 163, an input-output port 164, and a communication port 165. The storage 163 records a program for constructing functional modules of the main body 110. The storage 163 is a computer-readable recording medium such as a hard disk, a nonvolatile semiconductor memory, a magnetic disk, or an optical disk. The memory 162 temporarily stores a program loaded from the storage 163, a calculation result of the processor 161, and the like. The processor 161 constructs the functional modules by executing a program in cooperation with the memory 162. The input-output port 164 performs input or output of an electrical signal to or from the monitor 120 or the input device 130 according to a command from the processor 161. The input-output port 164 may perform input or output of an electrical signal to or from other devices. The communication port 165 performs data communication with other devices via a communication network (N) according to a command from the processor 161.

The monitor 120 is a device for displaying information output from the main body 110. An example of the monitor 120 is a liquid crystal panel.

The input device 130 is a device for inputting information to the main body 110. Examples of the input device 130 include operation interfaces such as switches and operation keys.

The monitor 120 and the input device 130 may be integrated as a touch panel.

Friction Compensation

The feedforward control part 12 calculates a continuous value for compensating for a friction acting on the control target 9 as a feedforward compensation value. A friction acting on the control target 9 occurs when the control target 9 is caused to operate by the motor control device 1. A friction mixes from outside into a command (that is, an operation amount) and affects an operation (that is, a control amount) of the control target. The feedforward control part 12 calculates a feedforward compensation value for compensating for a friction. Since the motor control device 1 outputs a command that reflects the feedforward compensation value, the control target 9 can execute an operation that satisfies a target value.

In one example, the feedforward control part 12 compensates for a friction torque acting on the control target 9 due to an operation of the motor 91. Since the speed of the motor 91 can be reversed (in other words, a rotation direction of the motor 91 can be changed), the feedforward control part 12 may calculate a feedforward compensation value corresponding to a speed reversal.

Figure 4:
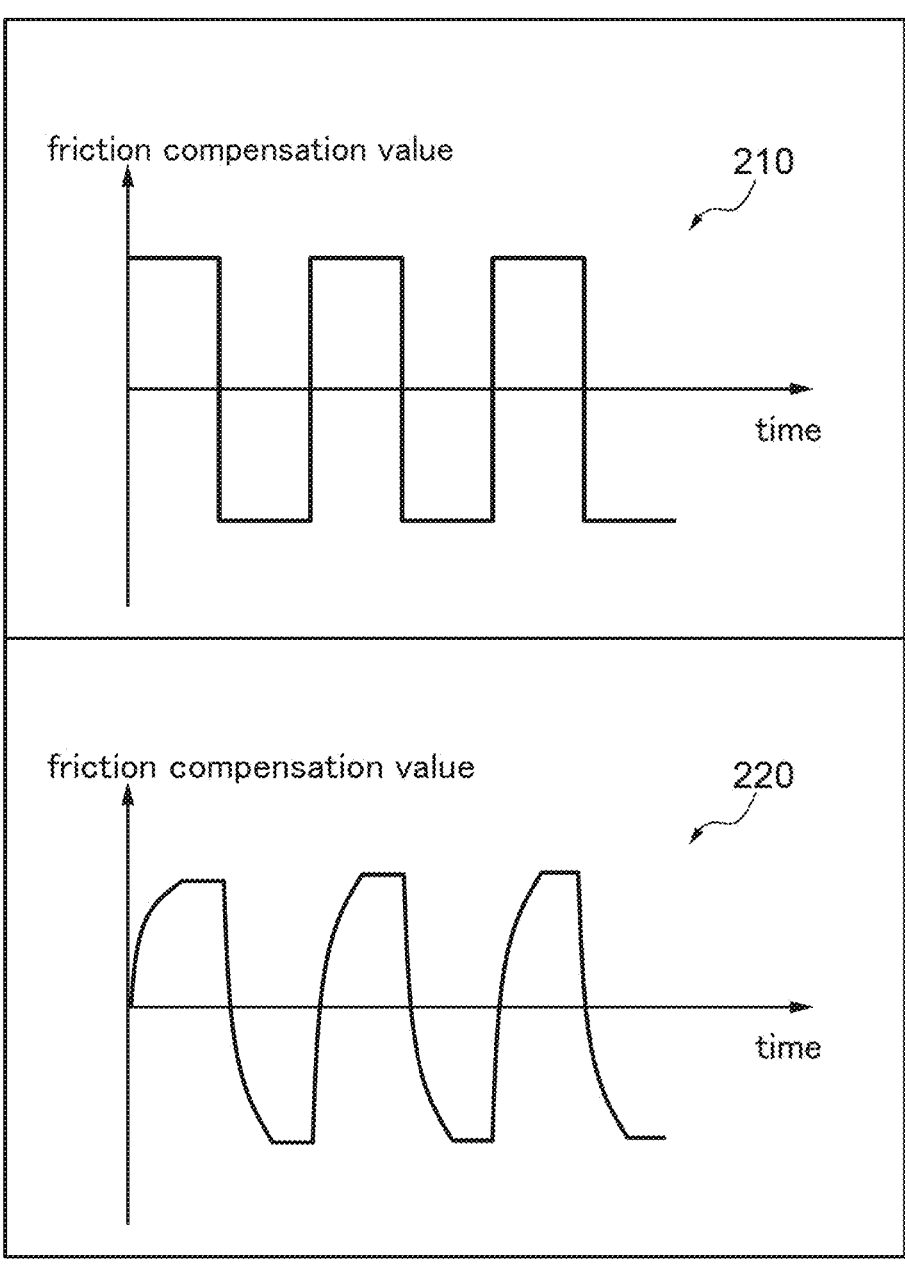
FIG. 4 is a diagram for describing friction compensation.

FIG. 4 is a diagram for describing friction compensation. A waveform 210 illustrates an example of friction compensation using a conventional method. A waveform 220 illustrates an example of friction compensation settings by the feedforward control part 12. In both graphs, a horizontal axis indicates an elapsed time, and a vertical axis indicates a friction compensation value.

A feedforward compensation model (feedforward control device) according to a conventional method is expressed by Formula 1.

Mathematical Formula 1

$$M \cdot \ddot{x} = \tau_{ref} - D \cdot \dot{x} - \tau_{fri} + \mathrm{sgn}(\dot{x}) \cdot T_a \tag{1}$$

Here, M is a mass coefficient of the drive target 92, x is a movement amount of the drive target 92, D is a viscosity coefficient of the drive target 92, $\tau_{ref}$ is a torque command value, and $\tau_{fri}$ is a friction torque (friction acting on the control target 9). Both the mass coefficient (M) and the viscosity coefficient (D) are mechanical properties obtained by system identification. In one example, the viscosity coefficient (D) is obtained by assuming viscous friction between the motor 91 and the drive target 92 (for example, viscosity of bearing grease) and examining values of a mass term and a damper term by system identification in which mechanical characteristics are examined by identifying a change in angle or angular speed when a torque command is given to the motor 91. sgn ( ) is a sign function based on a speed of the motor 91, and takes a value of 1, 0, or −1 according to the speed (rotation direction) of the motor 91. Ta is a constant for compensating for a friction torque.

As illustrated in the pulsed waveform 210, in the conventional method, the friction compensation value changes discontinuously in a pulsed manner with reversal of the speed of the motor 91. Since this discontinuous friction compensation value is reflected in the feedforward compensation value, a sudden change in torque command occurs due to a discontinuous change in the feedforward compensation value. Therefore, an unintended phenomenon such as vibration occurs in the control target 9.

On the other hand, a feedforward compensation model (feedforward control device) applied to the feedforward control part 12 is expressed by Formula 2.

Mathematical Formula 2

$$M \cdot \ddot{x} = \tau_{ref} - D \cdot \dot{x} - \tau_{fri} + f_{cont}(x) \qquad (2)$$

Here, $f_{cont}(x)$ is a continuous function for compensating for a friction torque ($\tau_{fri}$). Since a continuous function is used, the friction compensation value changes continuously (in other words, smoothly) as illustrated in the waveform 220. Therefore, a feedforward compensation value that reflects the friction compensation value also becomes a continuous value. Since the feedforward compensation value is a continuous value, the torque command changes smoothly. Therefore, high responsiveness of the control target 9 to a command can be realized while avoiding or reducing an unintended phenomenon such as vibration.

The feedforward control part 12 calculates a feedforward compensation value based on a control target model that indicates a relationship between an operation of the control target 9 and a friction acting on the control target 9. In the present disclosure, this relationship is also referred to as an "operation-friction relationship." In one example, an operation of the control target 9 relates to a rotation of the motor 91 that causes the control target 9 to operate. Considering that the speed of the motor 91 can be reversed, the control target model may indicate an operation-friction relationship when the speed of the motor 91 is reversed. Further, the control target model may indicate an operation-friction relationship for each of the positive direction and the negative direction of the motor 91.

Calculation of a feedforward compensation value based on the control target model is described with illustrating a torque command ($\tau_{ref}$) as an example of a command to be compensated by the feedforward compensation value.

As illustrated in FIG. 2, the torque command ($\tau_{ref}$) is generated by a torque command ($\tau_{fb}$) output from the feedback control part 11 and a torque command ($\tau_{ff}$) output from the feedforward control part 12. This generation is expressed, for example, by Formula 3. That is, in one example, the torque command ($\tau_{ref}$) is obtained by adding the torque command ($\tau_{ff}$) to the torque command ($\tau_{fb}$).

Mathematical Formula 3

$$\tau_{ref} = \tau_{fb} + \tau_{ff} \qquad (3)$$

The torque command ($\tau_{ff}$), which is the feedforward compensation value, is expressed as Formula 4.

Mathematical Formula 4

$$\tau_{ff} = M \cdot \ddot{x}_{ref} + D \cdot \dot{x}_{ref} + \hat{\tau}_{comp} \qquad (4)$$

Here, $x_{ref}$ is a position command. $\hat{\tau}_{comp}$ is a friction compensation value that compensates for a friction torque ($\hat{\tau}_{fri}$) estimated by a continuous function and is obtained based on an operation-friction relationship. $\hat{\tau}_{comp} = -\hat{\tau}$ fri.

Figure 5:
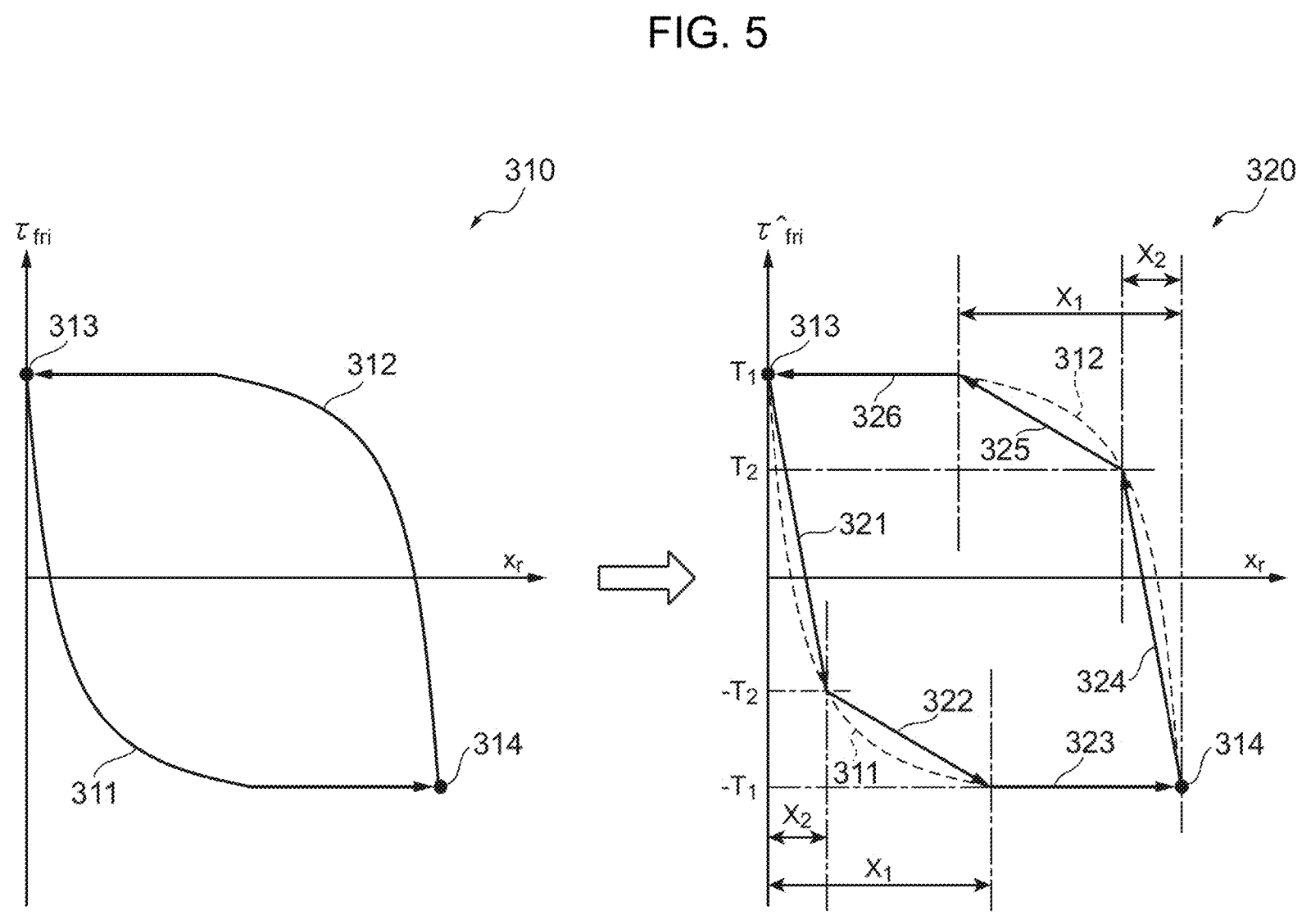

FIG. 5 illustrates an example of the control target model for obtaining the friction compensation value ($\hat{\tau}_{comp}$). In this example, a rotation amount ($x_r$) of the motor 91 from a time point when the speed of the motor 91 is reversed is illustrated as an operation of the control target 9, and the friction torque ($\tau_{fri}$) is illustrated as an example of a friction. The rotation amount of the motor 91 may be expressed by a rotation angle, or may be expressed by a moving distance in a circumferential direction.

FIG. 5 graphically illustrates a friction model 310 that represents a relationship between a rotation amount of the motor 91 and a change in actual friction torque ($\tau_{fri}$). The vertical axis indicates the friction torque ($\tau_{fri}$), and the horizontal axis indicates the rotation amount ($x_r$). An arrow 311 indicates transition of the friction torque when the motor 91 rotates in the positive direction, and an arrow 312 indicates transition of the friction torque when the motor 91 rotates in the negative direction. Points (313, 314) both indicate that the speed of the motor 91 is reversed. As illustrated in the friction model 310, the friction has a nonlinear characteristic and saturates to a specific value after the motor 91 has rotated sufficiently after the reversal of the speed.

FIG. 5 also graphically illustrates a control target model 320 that approximates the friction model 310. The vertical axis indicates an estimated friction torque ($\hat{\tau}_{fri}$), and the horizontal axis indicates the rotation amount ($x_r$). The control target model 320 includes multiple continuous functions (321-326) indicating an operation-friction relationship. These continuous functions (321-326) correspond to $f_{cont}(x)$ in Formula 2. In one example, the multiple continuous functions (321-326) may be set based on a mass-spring-damper system in which a friction (in this example, a frictional torque) is represented as a spring. In the mass-spring-damper system, a friction may be represented as multiple springs by a rheological model. In this case, the continuous function (321-326) is set based on the mass-spring-damper system including the rheological model.

The multiple continuous functions (321-326) are connected in this order (the continuous functions (323, 324) are connected at the point 314, and the continuous functions (326, 321) are connected at the point 313). Therefore, the estimated friction torque ($\hat{\tau}_{fri}$) approximated by the control target model 320 is a continuous value, and the friction compensation value ($\hat{\tau}_{comp}$) that compensates for the estimated friction torque ($\hat{\tau}_{fri}$) is also a continuous value.

The continuous function (321-323) approximates the operation-friction relationship when the motor 91 rotates in the positive direction. The continuous function 321 corresponds to an interval where the rotation amount ($x_r$) is 0 or more and less than $X_2$, and the estimated friction torque changes linearly from $T_1$ to $-T_2$ in this interval. Therefore, the interval of the continuous function 321 is an unsteady interval in which the friction changes according to the change in the rotation amount. The continuous function 322 corresponds to an interval where the rotation amount $(x_r)$ is $X_2$ or more and less than $X_1$, and the estimated friction torque changes linearly from $-T_2$ to $-T_1$ in this interval. Therefore, the interval of the continuous function 322 is also an unsteady interval. The continuous function 323 corresponds to an interval where the rotation amount $(x_r)$ is $X_1$ or more, and the estimated friction torque is saturated at $-T_1$ in this interval. Therefore, the interval of the continuous function 323 is a steady interval in which the friction is constant regardless of the change in the rotation amount.

The continuous function (324-326) approximates the operation-friction relationship when the motor 91 rotates in the negative direction. The continuous function 324 corresponds to an interval where the rotation amount $(x_r)$ is 0 or more and less than $X_2$, and the estimated friction torque changes linearly from $-T_1$ to $T_2$ in this interval. Therefore, the interval of the continuous function 324 is an unsteady interval. The continuous function 325 corresponds to an interval where the rotation amount $(x_r)$ is $X_2$ or more and less than $X_1$, and the estimated friction torque changes linearly from $T_2$ to $T_1$ in this interval. Therefore, the interval of the continuous function 325 is also an unsteady interval. The continuous function 326 corresponds to an interval where the rotation amount $(x_r)$ is $X_1$ or more, and the estimated friction torque is saturated at $T_1$ in this interval. Therefore, the interval of the continuous function 326 is a steady interval.

Therefore, the multiple continuous functions (321-326) correspond to the multiple intervals based on the rotation amount $(x_r)$.

The continuous function 321 is a non-constant function represented by Formula 5. $K_1$ represents a slope, and $K_1 = (T_1 + T_2)/X_2$.

Mathematical Formula 5

$$\hat{\tau}_{fri} = T_1 - K_1 \cdot x_r \tag{5}$$

From Formulas 4 and 5, the feedforward compensation model in the interval where the rotation amount $(x_r)$ is 0 or more and less than $X_2$ is developed as follows. Formula 6 is obtained by moving the constant $T_1$, which is treated as an offset value, to the left side.

Mathematical Formula 6

$$\tau_{ff} = M \cdot \ddot{x}_{ref} + D \cdot \dot{x}_{ref} + (-T_1 + K_1 \cdot x_r)$$

$$\tau_{ff} + T_1 = M \cdot \ddot{x}_{ref} + D \cdot \dot{x}_{ref} + K_1 \cdot x_r \tag{6}$$

Since differential values (speed and acceleration) of the command $(x_{ref})$ equal to differential values (speed and acceleration) of the rotation amount $(x_r)$, Formula 6 can be replaced with Formula 7.

Mathematical Formula 7

$$\tau_{ff} + T_1 = M \cdot \ddot{x}_r + D \cdot \dot{x}_r + K_1 \cdot x_r \tag{7}$$

Formula 8 is obtained by performing Laplace transform and modification on Formula 7 as follows. Formula 8 represents a feedback compensation model (feedforward control device) that integrates a mechanical characteristic with a linear characteristic and a friction with a nonlinear characteristic.

Mathematical Formula 8

$$T_{ff} + T_1 = \left(M \cdot s^2 + D \cdot s + K_1\right) \cdot X_r \tag{8}$$

$$\frac{X_r}{T_{ff} + T_1} = \frac{1}{M \cdot s^2 + D \cdot s + K_1}$$

The continuous function 322 is a non-constant function represented by Formula 9. $K_2$ represents a slope, and $K_2 = (T_1 - T_2)/(X_1 - X_2)$.

Mathematical Formula 9

$$\hat{\tau}_{fri} = -T_2 - K_2 \cdot (x_r - X_2) \tag{9}$$

From Formulas 4 and 9, the feedforward compensation model in the interval where the rotation amount $(x_r)$ is $X_2$ or more and less than $X_1$ is developed as follows. Formula is obtained by moving the two constants $(-T_2)$ and $(K_2 \cdot X_2)$ that are treated as offset values to the left side and replacing the differential value of the command $(x_{ref})$ with the differential value of the rotation amount $(x_r)$.

Mathematical Formula 10

$$\tau_{ff} = M \cdot \ddot{x}_{ref} + D \cdot \dot{x}_{ref} + \{T_2 + K_2 \cdot (x_r - X_2)\}$$

$$\tau_{ff} - T_2 + K_2 \cdot X_2 = M \cdot \ddot{x}_{ref} + D \cdot \dot{x}_{ref} + K_2 \cdot x_r$$

$$\tau_{ff} - T_2 + K_2 \cdot X_2 = M \cdot \ddot{x}_r + D \cdot \dot{x}_r + K_2 \cdot x_r \tag{10}$$

Formula 11 is obtained by performing Laplace transform and modification on Formula 10 as follows. Formula 11 also represents a feedback compensation model that integrates a mechanical characteristic with a linear characteristic and a friction with a nonlinear characteristic.

Mathematical Formula 11

$$T_{ff} - T_2 + K_2 \cdot X_2 = \left(M \cdot s^2 + D \cdot s + K_2\right) \cdot X_r \tag{11}$$

$$\frac{X_r}{T_{ff} - T_2 + K_2 \cdot X_2} = \frac{1}{M \cdot s^2 + D \cdot s + K_2}$$

For each of the continuous functions (323-326), a corresponding feedback compensation model can also be obtained using the same method as for the continuous functions (321, 322).

The continuous function 323 is a constant function represented by Formula 12.

Mathematical Formula 12

$$\hat{\tau}_{fri} = -T_1 \tag{12}$$

The feedback control model corresponding to the continuous function 323 is represented by Formula 13.

Mathematical Formula 13

$$\frac{X_r}{T_{ff} - T_1} = \frac{1}{M \cdot s^2 + D \cdot s} \tag{13}$$

The continuous function 324 is a non-constant function represented by Formula 14.

Mathematical Formula 14

$$\hat{\tau}_{fri} = -T_1 - K_1 \cdot x_r \tag{14}$$

The feedback control model corresponding to the continuous function 324 is represented by Formula 15.

Mathematical Formula 15

$$\frac{X_r}{T_{ff} - T_1} = \frac{1}{M \cdot s^2 + D \cdot s + K_1} \tag{15}$$

The continuous function 325 is a non-constant function represented by Formula 16.

Mathematical Formula 16

$$\hat{\tau}_{fri} = T_2 - K_2 \cdot (x_r - X_2) \tag{16}$$

The feedback control model corresponding to the continuous function 325 is represented by Formula 17.

Mathematical Formula 17

$$\frac{X_r}{T_{ff} + T_2 + K_2 \cdot X_2} = \frac{1}{M \cdot s^2 + D \cdot s + K_2} \tag{17}$$

The continuous function 326 is a constant function represented by Formula 18.

Mathematical Formula 18

$$\hat{\tau}_{fri} = T_1 \tag{8}$$

The feedback control model corresponding to the continuous function 326 is represented by Formula 19.

Mathematical Formula 19

$$\frac{X_r}{T_{ff} + T_1} = \frac{1}{M \cdot s^2 + D \cdot s} \tag{19}$$

The control target model 320 illustrates various examples regarding the feedforward control part 12. That is, the feedforward control part 12 may calculate a continuous value corresponding to a reversal of the speed of the motor 91 as a feedforward compensation value. The feedforward control part 12 may calculate a feedforward compensation value for each of the positive direction and the negative direction of the motor 91 based on the control target model 320. Based on the control target model 320 that indicates a relationship between a rotation amount of the motor 91 and a friction acting on the control target 9 from a time point when the speed of the motor 91 is reversed, the feedforward control part 12 may calculate a continuous value corresponding to the rotation amount as a feedforward compensation value.

The control target model 320 shows a hysteresis in the operation-friction relationship. "Hysteresis" refers to that a current state of a certain system depends not only on a current condition but also on a history of past situations. The control target model 320 shows that, even when the rotation amount ($x_r$) of the motor 91 from the time point when the speed of motor 91 is reversed is the same (that is, even when the current condition is the same), the estimated friction torque ($\hat{\tau}_{fri}$) differs depending on the rotation direction of the motor 91 (that is, the history of past situations). In one example, the feedforward control part 12 calculates a feedforward compensation value for each of the positive direction and the negative direction of the motor 91 based on the hysteresis.

The control target model 320 represents a point-symmetric hysteresis loop. However, it is also possible that the control target model 320 is represented by a hysteresis loop that is not point-symmetric.

Figure 6:
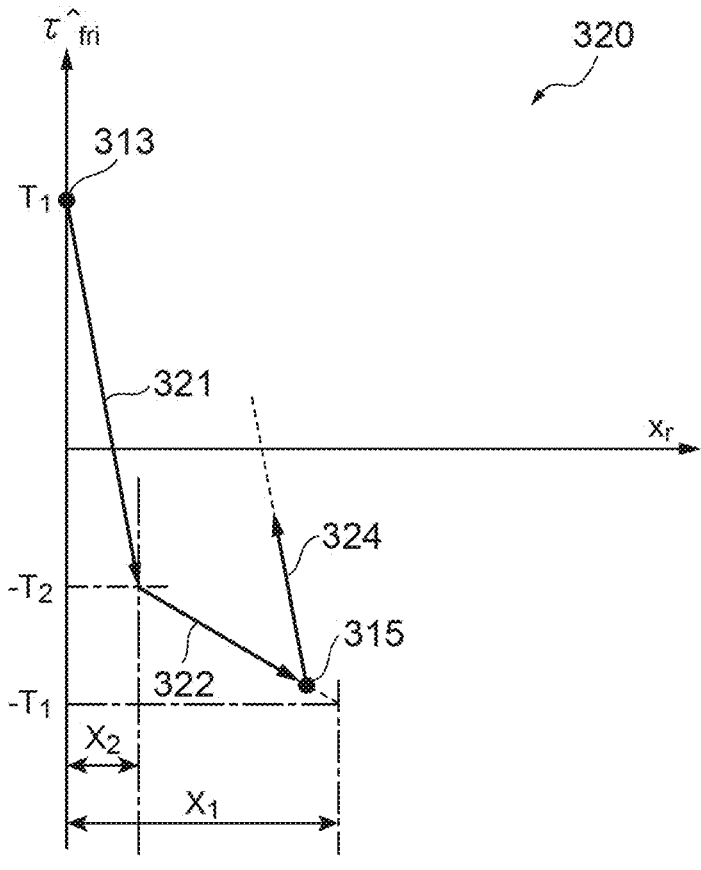
FIG. 6 illustrates an example of the control target model.

The control target model 320 can also be applied to a case where the speed of the motor 91 is reversed before the estimated friction torque ($\hat{\tau}_{fri}$) saturates. Also in this case, the control target model 320 shows a hysteresis in the operation-friction relationship, and the feedforward control part 12 calculates a feedforward compensation value based on the hysteresis. FIG. 6 illustrates an example of a control target model in this case. In the example of FIG. 6, the speed of the motor 91 is reversed at a time point 315 when the rotation amount of the motor 91 has exceeded $X_2$ but has not reached $X_1$.

Assuming that the estimated friction torque ($\hat{\tau}_{fri}$) at the time point 315 obtained by the continuous function 322 is $-T_3$, the continuous function 324 corresponding to the motor 91 that has started rotating in the negative direction is represented by Formula 20.

Mathematical Formula 20

$$\hat{\tau}_{fri} = -T_3 - K_1 \cdot x_r \tag{20}$$

The feedback control model corresponding to the continuous function 324 is represented by Formula 21. Formula 21 differs from Formula 15 in the constant treated as an offset value.

Mathematical Formula 21

$$\frac{X_r}{T_{ff} - T_3} = \frac{1}{M \cdot s^2 + D \cdot s + K_1} \tag{21}$$

The feedforward control part 12 may calculate a continuous value as a feedforward compensation value by perfect tracking control (PTC). "Perfect tracking control" refers to a digital control system in which an output tracks a target without error at sample points. By using PTC, an unstable zero point that can occur when a feedforward compensation value is executed by digital control can be avoided.

Control Method

Figure 7:
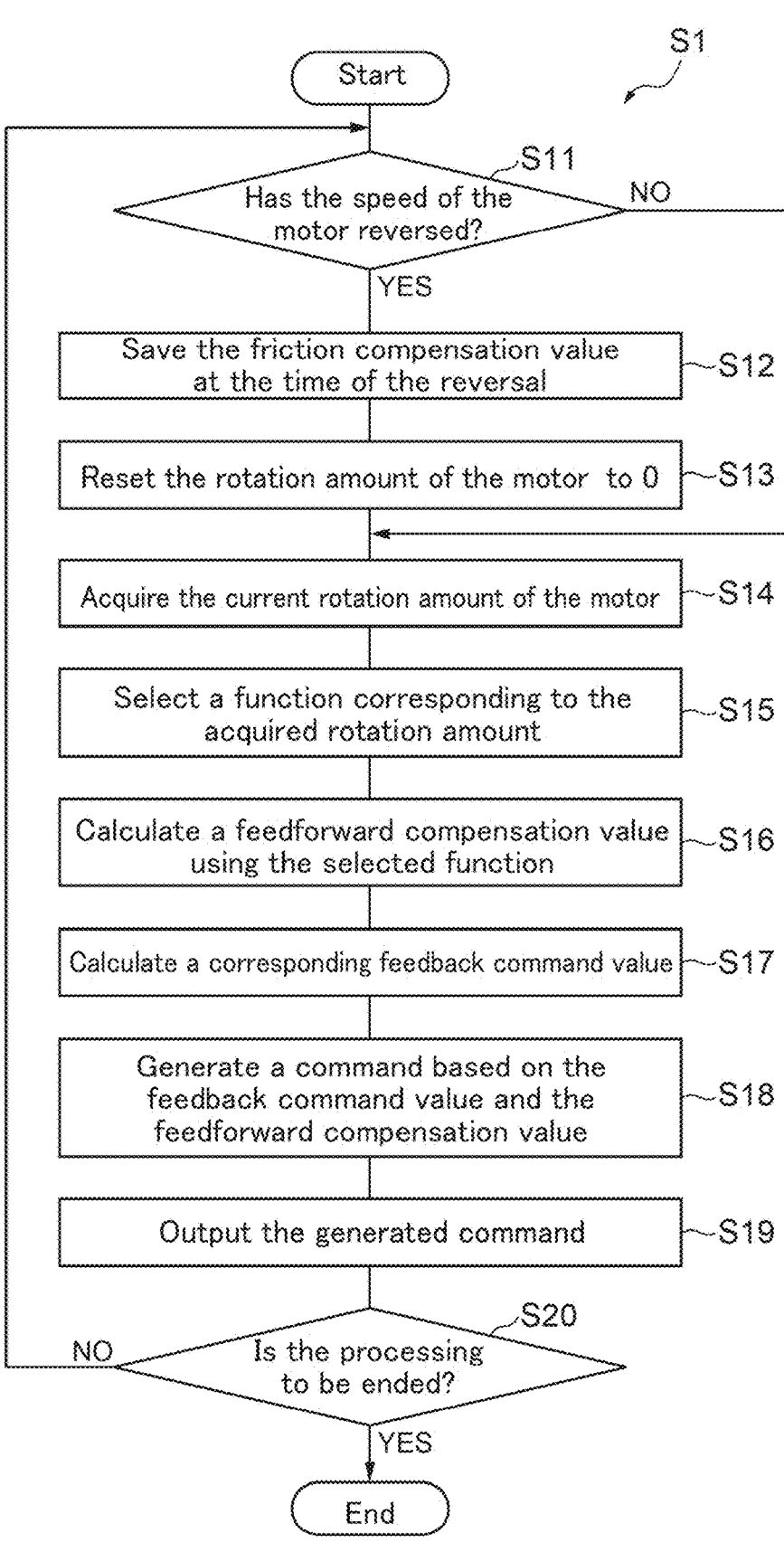
FIG. 7 is a flowchart illustrating an example of processing in the control system.

As an example of a control method according to the present disclosure, an example of processing processes executed by the motor control device 1 (control system) is described with reference to FIG. 7. FIG. 7 is a flowchart illustrating an example of processing in the motor control device 1 (control system) as a processing flow (S1). That is, the motor control device 1 executes the processing flow (S1). In one example, the motor control device 1 executes the processing flow (S1) in response to that the motor 91 has been started to rotate.

In S11, the motor control device 1 determines whether or not the speed of the motor 91 has been reversed. When the speed of the motor 91 has been reversed (YES in S11), the process proceeds in the order of S12, S13, and S14. When the speed of the motor 91 has not been reversed, that is, when the motor 91 continues to rotate in one direction (NO in S11), the process skips S12 and S13 and proceeds to S14.

In S12, the feedforward control part 12 stores a friction compensation value at the time point when the speed of the motor is reversed.

In S13, the feedforward control part 12 resets the rotation amount of the motor to zero. By this reset, the rotation amount of the motor 91 from the time point when the speed of the motor 91 is reversed can be acquired.

In S14, the feedforward control part 12 acquires a current rotation amount of the motor 91. As described above, the current rotation amount is a rotation amount from the time point when the speed of the motor 91 is reversed.

In S15, the feedforward control part 12 selects a function corresponding to the acquired rotation amount. In one example, the feedforward control part 12 selects one continuous function corresponding to the acquired rotation amount from multiple continuous functions. For example, the feedforward control part 12 selects a non-constant function when the rotation amount corresponds to an unsteady interval, and selects a constant function when the rotation amount corresponds to a steady interval. The feedforward control part 12 may select one continuous function from multiple continuous functions based on the acquired rotation amount and the rotation direction of the motor 91.

As an example, selection of a continuous function when the control target model 320 illustrated in FIG. 5 is used. When the motor 91 is rotating in the positive direction and the rotation amount is 0 or more and less than $X_2$, the feedforward control part 12 selects the continuous function 321. When the motor 91 is rotating in the positive direction and the rotation amount is $X_2$ or more and less than $X_1$, the feedforward control part 12 selects the continuous function 322. When the motor 91 is rotating in the positive direction and the rotation amount is $X_1$ or more, the feedforward control part 12 selects the continuous function 323. When the motor 91 is rotating in the negative direction and the rotation amount is 0 or more and less than $X_2$, the feedforward control part 12 selects the continuous function 324. When the motor 91 is rotating in the negative direction and the rotation amount is $X_2$ or more and less than $X_1$, the feedforward control part 12 selects the continuous function 325. When the motor 91 is rotating in the negative direction and the rotation amount is $X_1$ or more, the feedforward control part 12 selects the continuous function 326.

As illustrated in the control target model 320, at least one unsteady interval can include a first unsteady interval in which the friction changes in a first mode according to a change in the rotation amount, and a second unsteady interval in which the friction changes in a second mode according to a change in the rotation amount. At least one non-constant function includes a first non-constant function corresponding to the first unsteady interval and a second non-constant function corresponding to the second unsteady interval. The feedforward control part 12 selects the first non-constant function when the rotation amount corresponds to the first unsteady interval, and selects the second non-constant function when the rotation amount corresponds to the second unsteady interval. In the control target model 320, when the motor 91 rotates in the positive direction, the first non-constant function is the continuous function 321, and the first mode is represented by the slope $(K_1)$. The second non-constant function is the continuous function 322, and the second mode is represented by the slope $(K_2)$. When the motor 91 rotates in the negative direction, the first non-constant function is the continuous function 324, and the first mode is represented by the slope $(K_1)$. The second non-constant function is the continuous function 325, and the second mode is represented by the slope $(K_2)$.

In S16, the feedforward control part 12 calculates a feedforward compensation value using the selected function. In other words, the feedforward control part 12 calculates a continuous value as a feedforward compensation value using the selected function. In one example, the feedforward control part 12 calculates a feedforward compensation value based on a feedback compensation model incorporating the selected continuous function. For example, when the continuous function 321 illustrated in FIG. 5 is selected, the feedforward control part 12 calculates a feedforward compensation value based on the feedback compensation model indicated in Formula 8. The feedforward control part 12 uses the friction compensation value stored in S12 as an offset value used in the selected feedforward compensation model.

In S17, the feedback control part 11 calculates a feedback command value corresponding to the feedforward compensation value.

In S18, the command generation part 13 generates a command based on the feedback command value and the feedforward compensation value. In one example, as shown in Formula 3 above, the command generation part 13 generates a command by adding the feedforward compensation value to the feedback command value.

In S19, the command part 14 outputs the generated command to the control target 9. Since this command is set in consideration of the friction that acts on the control target 9, the influence of the friction on the operation of the control target 9 is eliminated or suppressed. Therefore, the control target 9 can exhibit smooth and high responsiveness.

In S20, when the control of the control target 9 is to be continued (NO in S20), the process returns to S11, and the motor control device 1 executes the processes of S11-S19 again. In one example, the motor control device 1 repeats the processes of S11-S19 and continues to provide a feedforward compensation value that is continuous value. The feedforward compensation value allows the control target 9 to operate smoothly while avoiding or reducing an unintended phenomenon such as vibration.

In S20, when the control of the control target 9 is to be ended (YES in S20), the motor control device 1 ends the processing flow (S1). In one example, the end of the processing flow (S1) means that the motor 91 is stopped.

Program

The functional modules of the motor control device 1 are realized by loading a control program to the processor 161 or the memory 162 and causing the processor 161 to execute the program. The control program contains codes for realizing the functional modules of the motor control device 1. The processor 161 operates the input-output port 164 or the communication port 165 according to the control program, and executes reading and writing of data in the memory 162 or the storage 163. The functional modules of the motor control device 1 are realized through such processing.

The control program may be provided after being permanently recorded on a non-temporary recording medium such as a CD-ROM, a DVD-ROM, or a semiconductor memory. Or, the control program may be provided over a communication network as a data signal superimposed on a carrier wave.

As described above, a control system according to one aspect of the present disclosure includes: a feedforward control part that, based on a control target model that indicates a relationship between an operation of a control target and a friction acting on the control target, calculates a continuous value for compensating for the friction as a feedforward compensation value; a command generation part that generates a command based on the calculated feedforward compensation value; and a command part that outputs the generated command for causing the control target to operate.

A control method according to one aspect of the present disclosure to be executed by a control system including at least one processor includes: a process in which, based on a control target model that indicates a relationship between an operation of a control target and a friction acting on the control target, a continuous value for compensating for the friction is calculated as a feedforward compensation value; a process in which a command is generated based on the calculated feedforward compensation value; and a process in which the generated command for causing the control target to operate is output.

A control program according to one aspect of the present disclosure causes a computer to execute: a process in which, based on a control target model that indicates a relationship between an operation of a control target and a friction acting on the control target, a continuous value for compensating for the friction is calculated as a feedforward compensation value; a process in which a command is generated based on the calculated feedforward compensation value; and a process in which the generated command for causing the control target to operate is output.

In such an aspect, since the feedforward compensation value that compensates for the friction is given as a continuous value, a sudden change in command is suppressed. Therefore, a command with friction appropriately compensated can be provided to the control target. With this command, for example, vibration in the control target can be suppressed or avoided, and the control target can be caused to operate as intended by a user.

The control system according to another aspect may further include a feedback control part that calculates a feedback command value by feedback control based on a response from the control target, and the command generation part may generate a command based on the feedback command value and the feedforward compensation value. Since a sudden change in command is suppressed by the continuously changing feedforward compensation value, a command with friction appropriately compensated can be provided to the control target in a two-degree-of-freedom control system.

In the control system according to another aspect, the control target model may indicate the relationship when the speed of the motor that causes the control target to operate is reversed, and the feedforward control part may calculate the continuous value corresponding to the reversal of the speed of the motor as the feedforward compensation value. Since the continuity of the feedforward compensation value is maintained even when the speed of the motor is reversed, even when the rotation direction of the motor changes, a sudden change in command can be suppressed, and an appropriate command can be provided to the control target.

In the control system according to another aspect, the feedforward control part may calculate the feedforward compensation value based on the control target model for each of the positive direction and the negative direction of the motor. Since control target models are prepared for both rotation directions of the motor, a command with friction appropriately compensated can be provided to the control target for either rotation direction.

In the control system according to another aspect, the operation of the control target may include a rotation amount of the motor from a time point when the speed of the motor is reversed, and the feedforward control part may calculate the continuous value corresponding to the rotation amount as the feedforward compensation value based on the control target model indicating the relationship between the rotation amount and the friction. By considering the rotation amount of the motor, which is closely related to the friction, an appropriate feedforward compensation value can be calculated.

In the control system according to another aspect, the control target model may indicate a hysteresis in the relationship, and the feedforward control part may calculate the feedforward compensation value based on the hysteresis for each of the positive direction and the negative direction. Since the hysteresis is taken into account, the feedforward compensation value can be appropriately set according to rotation direction of the motor.

The control system according to another aspect, the feedforward control part may calculate the feedforward compensation value based on the hysteresis represented by a point-symmetrical hysteresis loop. By considering the hysteresis with symmetry, the modes of the feedforward compensation values in the two rotation directions of the motor are commonized. This commonization allows a control target model to be easily constructed.

In the control system according to another aspect, the control target model may include at least one continuous function indicating the relationship, and the feedforward control part may calculate the continuous value as the feedforward compensation value using the at least one continuous function. By introducing a continuous function, a continuous value for compensating for the friction can be easily calculated.

In the control system according to another aspect, the at least one continuous function may include multiple continuous functions corresponding to multiple intervals based on the rotation amount, and the feedforward control part may select one continuous function corresponding to the rotation amount from the multiple continuous functions, and may calculate the continuous value as the feedforward compensation value using the selected continuous function. Since the continuous functions are respectively prepared corresponding to the intervals based on the rotation amount, the feedforward compensation value can be appropriately set according to a situation of the rotation of the motor.

In the control system according to another aspect, the multiple intervals may include at least one unsteady interval in which the friction changes according to a change in the rotation amount, the multiple continuous functions may include at least one non-constant function set based on a mass-spring-damper system in which the friction is represented as a spring, and the feedforward control part may select the non-constant function when the rotation amount corresponds to the unsteady interval. By using a non-constant function based on the mass-spring-damper system, a feedforward compensation value in an unsteady interval where the friction changes according to the rotation amount can be appropriately set.

In the control system according to another aspect, in the mass-spring-damper system, the spring representing the friction may be represented by a rheological model, and the feedforward control part may select the non-constant function set based on the mass-spring-damper system including the rheology model when the rotation amount corresponds to the unsteady interval. By using a rheological model, a control target model that appropriately reflects a friction having a nonlinear characteristic can be designed. By using this control target model, an appropriate feedforward compensation value can be calculated.

In the control system according to another aspect, the at least one unsteady interval may include a first unsteady interval in which the friction changes in a first mode according to a change in the rotation amount, and a second unsteady interval in which the friction changes in a second mode according to a change in the rotation amount, the at least one non-constant function may include a first non-constant function corresponding to the first unsteady interval and a second non-constant function corresponding to the second unsteady interval, and the feedforward control part may select the first non-constant function when the rotation amount corresponds to the first unsteady interval, and may select the second non-constant function when the rotation amount corresponds to the second unsteady interval. By dividing the unsteady interval where the friction changes depending on the rotation amount into multiple intervals and respectively preparing dedicated non-constant functions for the divided intervals, the feedforward compensation value can be finely set according to the details of the friction.

In the control system according to another aspect, the multiple intervals may further include a steady interval in which the friction is constant regardless of the change in the rotation amount, the multiple continuous functions may further include a given constant function, and the feedforward control part may select the non-constant function when the rotation amount corresponds to the unsteady interval, and may select the constant function when the rotation amount corresponds to the steady interval. With this structure, the feedforward compensation value can be appropriately set even for an interval where the friction is constant (in other words, an interval where the friction is saturated).

In the control system according to another aspect, the feedforward control part may calculate the continuous value as the feedforward compensation value by perfect tracking control. By using the perfect tracking control (PTC), an unstable zero point that can occur when a feedforward compensation value is executed by digital control can be avoided.

Modified Example

In the above, the embodiment of the present disclosure has been described in detail. However, the present disclosure is not limited to the above embodiment. Various modifications are possible within a scope that does not depart from the spirit of the present disclosure.

In the above example, the motor control device 1 is separated from the control target 9. However, it is also possible that the motor control device is incorporated in the control target. That is, the control system according to the present disclosure may be applied to a control target.

In the above example, the motor control device 1 is a two-degree-of-freedom control system including the feedback control part 11 and the feedforward control part 12. However, it is also possible that the control system according to the present disclosure is applied to a device having a feedforward controller without having a feedback controller.

In the above example, the case is described where a spring is represented by a rheological model. However, it is also possible that, in addition to a spring, a damper is also represented by a rheological model. For example, the present modified example can be applied to the control target model 320 illustrated in FIG. 5 as follows. That is, by adding a term proportional to Mathematical Formula 22

$$\dot{x}_r$$

In each of the non-constant functions expressed by Formulas 5, 9, 14 and 16 above, a control target model for this modified example can be constructed.

A hardware structure of the system is not limited to a mode in which the functional modules are realized by executing a program. For example, at least some of the functional modules in the above example may be realized using logic circuits specialized for the functions, or may be realized using ASICs (Application Specific Integrated Circuits) in which the logic circuits are integrated.

The processing processes of the method executed by at least one processor are not limited to the above example. For example, some of the processes described above may be omitted, or the processes may be executed in a different order. Further, any two or more of the processes described above may be combined, or some of the processes may be modified or deleted. Or, in addition to the above steps, other processes may be executed.

When comparing relative magnitudes of two numerical values in a computer system or computer, either of two criteria of "equal to or larger than" and "larger than" may be used, and either of two criteria of "equal to or less than" and "less than" may be used. A selection of such criteria does not change technical significance of a process of comparing the relative magnitudes of two numerical values.

Japanese Patent Application Laid-Open Publication No. 2015-15844 describes a motor control device that controls a motor that drives a control target. The motor control device includes: a speed feedback control means that generates a pre-correction torque command for controlling such that an actual speed of a control target follows an input speed command; an inverse model calculation means that calculates a coefficient of an inverse model of a transfer function of the control target by using the speed command and the pre-correction torque command; a torque correction value generation means that generates a torque correction value by using the speed command and the coefficient of the inverse model; and a torque command generation means that generates a torque command for a motor that drives the control target by using the pre-correction torque command and the torque correction value.

A mechanism that provides a command with friction appropriately compensated to a control target is desired.

A control system according to one aspect of the present disclosure includes: a feedforward control part that, based on a control target model that indicates a relationship between an operation of a control target and a friction acting on the control target, calculates a continuous value for compensating for the friction as a feedforward compensation value; a command generation part that generates a command based on the calculated feedforward compensation value; and a command part that outputs the generated command for causing the control target to operate.

A control method according to one aspect of the present disclosure to be executed by a control system including at least one processor includes: a process in which, based on a control target model that indicates a relationship between an operation of a control target and a friction acting on the control target, a continuous value for compensating for the friction is calculated as a feedforward compensation value; a process in which a command is generated based on the calculated feedforward compensation value; and a process in which the generated command for causing the control target to operate is output.

A control program according to one aspect of the present disclosure causes a computer to execute: a process in which, based on a control target model that indicates a relationship between an operation of a control target and a friction acting on the control target, a continuous value for compensating for the friction is calculated as a feedforward compensation value; a process in which a command is generated based on the calculated feedforward compensation value; and a process in which the generated command for causing the control target to operate is output.

According to one aspect of the present disclosure, a command with friction appropriately compensated can be provided to a control target.

Obviously, numerous modifications and variations of the present invention are possible in light of the above teachings. It is therefore to be understood that within the scope of the appended claims, the invention may be practiced otherwise than as specifically described herein.

The invention claimed is:

1. A control system, comprising:

processing circuitry configured to calculate, based on a control target model that indicates a relationship between an operation of a control target and a friction acting on the control target, a continuous value for compensating for the friction as a feedforward compensation value, generate a command based on the feedforward compensation value, and output the command to cause the control target to operate, wherein the processing circuitry is further configured to calculate the continuous value as the feedforward compensation value by tracking control.

2. The control system according to claim 1, wherein the processing circuitry is configured to calculate a feedback command value by feedback control based on a response from the control target, and generate the command based on the feedback command value and the feedforward compensation value.

3. The control system according to claim 2, wherein the control target model indicates the relationship when a speed of a motor that causes the control target to operate is reversed, and the processing circuitry is configured to calculate the continuous value corresponding to the reversed speed of the motor as the feedforward compensation value.

4. The control system according to claim 1, wherein the control target model indicates the relationship when a speed of a motor that causes the control target to operate is reversed, and the processing circuitry is configured to calculate the continuous value corresponding to the reversed speed of the motor as the feedforward compensation value.

5. The control system according to claim 4, wherein the processing circuitry is configured to calculate the feedforward compensation value based on the control target model for each of a positive direction and a negative direction of the motor.

6. The control system according to claim 5, wherein the operation of the control target includes a rotation amount of the motor from a time point when the speed of the motor is reversed, and the processing circuitry is configured to calculate the continuous value corresponding to the rotation amount as the feedforward compensation value, based on the control target model indicating the relationship between the rotation amount and the friction.

7. The control system according to claim 6, wherein the control target model indicates a hysteresis in the relationship, and the processing circuitry is configured to calculate the feedforward compensation value based on the hysteresis for each of the positive direction and the negative direction.

8. The control system according to claim 7, wherein the processing circuitry is configured to calculate the feedforward compensation value based on the hysteresis represented by a point-symmetrical hysteresis loop.

9. The control system according to claim 8, wherein the control target model includes at least one continuous function indicating the relationship, and the processing circuitry is configured to calculate the continuous value as the feedforward compensation value using the at least one continuous function.

10. The control system according to claim 6, wherein the control target model includes at least one continuous function indicating the relationship, and the processing circuitry is configured to calculate the continuous value as the feedforward compensation value using the at least one continuous function.

11. The control system according to claim 10, wherein the at least one continuous function includes multiple continuous functions corresponding to multiple intervals based on the rotation amount, and the processing circuitry is configured to select one continuous function corresponding to the rotation amount from the multiple continuous functions, and calculate the continuous value as the feedforward compensation value using the continuous function.

12. The control system according to claim 11, wherein the multiple intervals include at least one unsteady interval in which the friction changes according to a change in the rotation amount, the multiple continuous functions include at least one non-constant function set based on a mass-spring-damper system in which the friction is represented as a spring, and the processing circuitry is configured to select the non-constant function when the rotation amount corresponds to the unsteady interval.

13. The control system according to claim 12, wherein in the mass-spring-damper system, the spring representing the friction is represented by a rheological model, and the processing circuitry is configured to select the non-constant function set based on the mass-spring-damper system including the rheology model, when the rotation amount corresponds to the unsteady interval.

14. The control system according to claim 13, wherein the at least one unsteady interval includes a first unsteady interval in which the friction changes in a first mode according to a change in the rotation amount, and a second unsteady interval in which the friction changes in a second mode according to a change in the rotation amount, the at least one non-constant function includes a first non-constant function corresponding to the first unsteady interval and a second non-constant function corresponding to the second unsteady interval, and the processing circuitry is configured to select the first non-constant function when the rotation amount corresponds to the first unsteady interval, and select the second non-constant function when the rotation amount corresponds to the second unsteady interval.

15. The control system according to claim 14, wherein the multiple intervals further include a steady interval in which the friction is constant regardless of the change in the rotation amount, the multiple continuous functions further include a given constant function, and the processing circuitry is configured to select the non-constant function when the rotation amount corresponds to the unsteady interval, and select the constant function when the rotation amount corresponds to the steady interval.

16. The control system according to claim 12, wherein the at least one unsteady interval includes a first unsteady interval in which the friction changes in a first mode according to a change in the rotation amount, and a second unsteady interval in which the friction changes in a second mode according to a change in the rotation amount, the at least one non-constant function includes a first non-constant function corresponding to the first unsteady interval and a second non-constant function corresponding to the second unsteady interval, and the processing circuitry is configured to select the first non-constant function when the rotation amount corresponds to the first unsteady interval, and select the second non-constant function when the rotation amount corresponds to the second unsteady interval.

17. The control system according to claim 12, wherein the multiple intervals further include a steady interval in which the friction is constant regardless of the change in the rotation amount, the multiple continuous functions further include a given constant function, and the processing circuitry is configured to select the non-constant function when the rotation amount corresponds to the unsteady interval, and select the constant function when the rotation amount corresponds to the steady interval.

18. The control system according to claim 1, wherein the tracking control is perfect tracking control.

19. A control method to be executed by a control system including processing circuitry, comprising:

calculating, by the processing circuitry of the control system, based on a control target model that indicates a relationship between an operation of a control target and a friction acting on the control target, a continuous value for compensating for the friction as a feedforward compensation value;

generating, by the processing circuitry of the control system, a command based on the feedforward compensation value; and outputting, by the processing circuitry of the control system, the command to cause the control target to operate, wherein the calculating further comprises calculating, by the processing circuitry, the continuous value as the feedforward compensation value by tracking control.

20. A non-transitory computer-readable storage medium including computer executable instructions, wherein the instructions, when executed by a computer, cause the computer to perform a method, the method comprising:

calculating, based on a control target model that indicates a relationship between an operation of a control target and a friction acting on the control target, a continuous value for compensating for the friction as a feedforward compensation value;

generating a command based on the feedforward compensation value; and outputting the command to cause the control target to operate, wherein the calculating further comprises calculating the continuous value as the feedforward compensation value by tracking control.

\*  \*  \*  \*  \*